(12) United States Patent
Reid

(10) Patent No.: US 8,640,029 B2
(45) Date of Patent: Jan. 28, 2014

(54) ICON LABEL PLACEMENT IN A GRAPHICAL USER INTERFACE

(75) Inventor: Glenn Reid, Woodside, CA (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 13/180,471

(22) Filed: Jul. 11, 2011

(65) Prior Publication Data

US 2012/0017151 A1    Jan. 19, 2012

Related U.S. Application Data

(63) Continuation of application No. 12/029,449, filed on Feb. 11, 2008, now Pat. No. 8,015,492, which is a continuation of application No. 10/638,082, filed on Aug. 7, 2003, now Pat. No. 7,437,682.

(51) Int. Cl.
*G06F 3/00* (2006.01)

(52) U.S. Cl.
USPC ........... 715/721; 715/719; 715/722; 715/788; 715/835

(58) Field of Classification Search
USPC ......................... 715/721, 719, 722, 788, 835
See application file for complete search history.

(56) References Cited

U.S. PATENT DOCUMENTS

| | | | |
|---|---|---|---|
| 5,579,055 A | 11/1996 | Hamilton et al. |
| 6,411,308 B1 | 6/2002 | Blonstein et al. |
| 6,452,610 B1 | 9/2002 | Reinhardt et al. |
| 6,469,711 B2 | 10/2002 | Foreman et al. |
| 6,690,391 B1 | 2/2004 | Proehl et al. |
| 6,816,174 B2 | 11/2004 | Tiongson et al. |
| 6,828,989 B2 | 12/2004 | Cortright |
| 6,851,091 B1 | 2/2005 | Honda et al. |
| 7,131,060 B1 | 10/2006 | Azuma |
| 7,356,242 B2 | 4/2008 | Nagasawa |
| 7,409,437 B2 | 8/2008 | Ullman et al. |
| 7,437,682 B1 | 10/2008 | Reid |
| 7,496,945 B2 | 2/2009 | Rodriguez et al. |
| 8,015,492 B2 | 9/2011 | Reid |
| 2002/0175932 A1 | 11/2002 | Yu et al. |
| 2003/0122861 A1 | 7/2003 | Jun et al. |
| 2004/0047461 A1 | 3/2004 | Weisman et al. |
| 2004/0090542 A1 | 5/2004 | Hirai et al. |
| 2004/0100495 A1 | 5/2004 | Brockway |

OTHER PUBLICATIONS

Portions of prosecution history of U.S. Appl. No. 10/638,082, Aug. 14, 2008, Reid, Glenn.
Portions of prosecution history of U.S. Appl. No. 12/029,449, Aug. 9, 2011, Reid, Glenn.

*Primary Examiner* — Sara England
(74) *Attorney, Agent, or Firm* — Schwegman Lundberg & Woessner, P.A.

(57) ABSTRACT

To improve the art of graphical user interfaces, the present invention introduces a system that displays iconic resource representations having a salient dimension in a manner that provides the user with an indication of where the user is within that resource. The system of the present invention achieves this goal with the use of a novel system of icon label placement for that resource icon. Specifically, the system of the present invention uses the position of a label on an iconic resource representation that extends beyond at least one edge of a window to convey a proportional position within than iconic resource representation. Thus, a user is given an understanding of the current proportional location within an iconic resource representation from where the graphical interface system renders the label on the iconic resource representation.

20 Claims, 9 Drawing Sheets

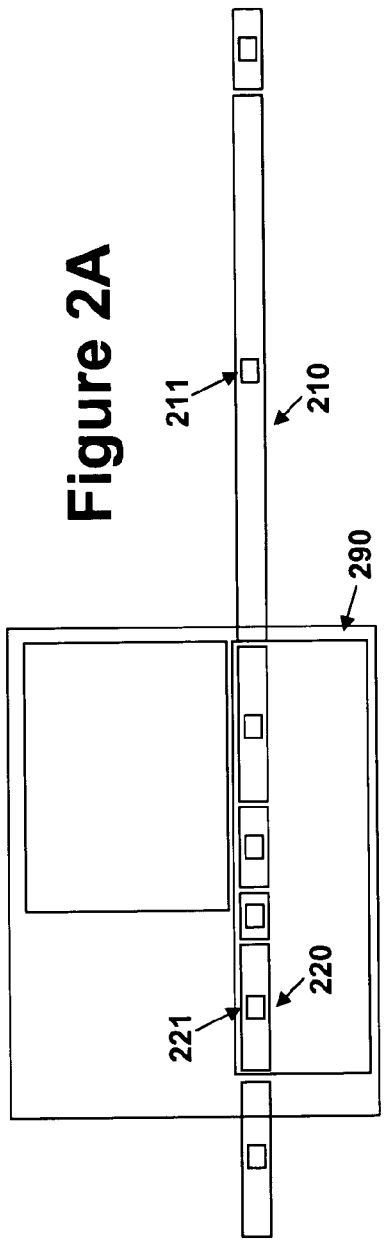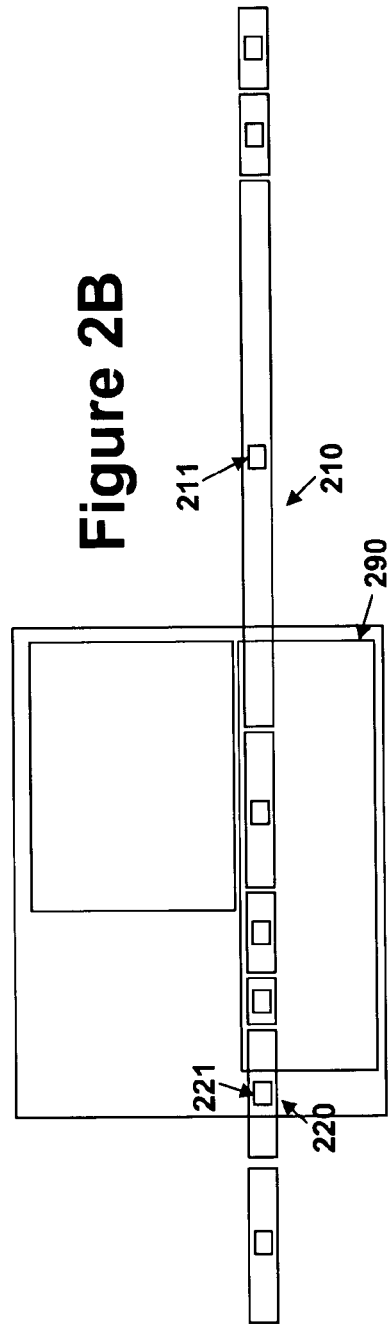

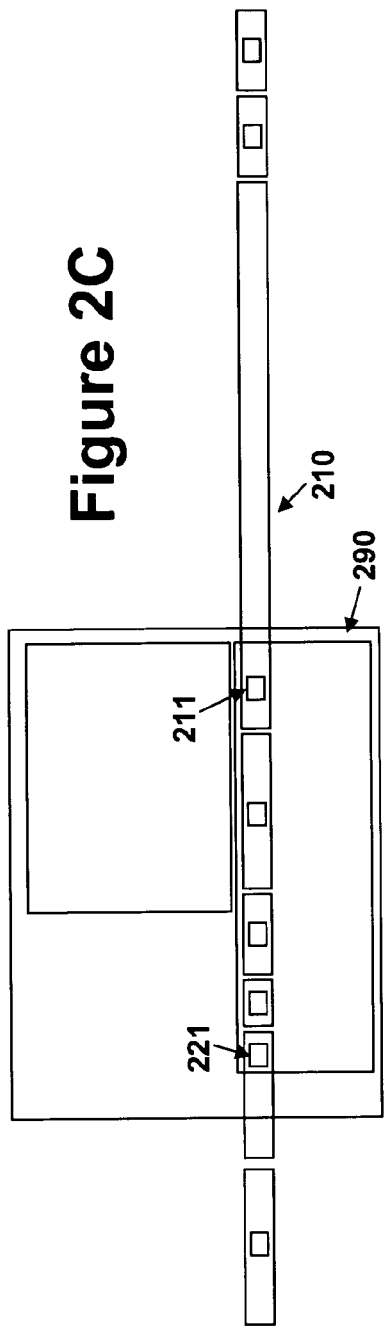
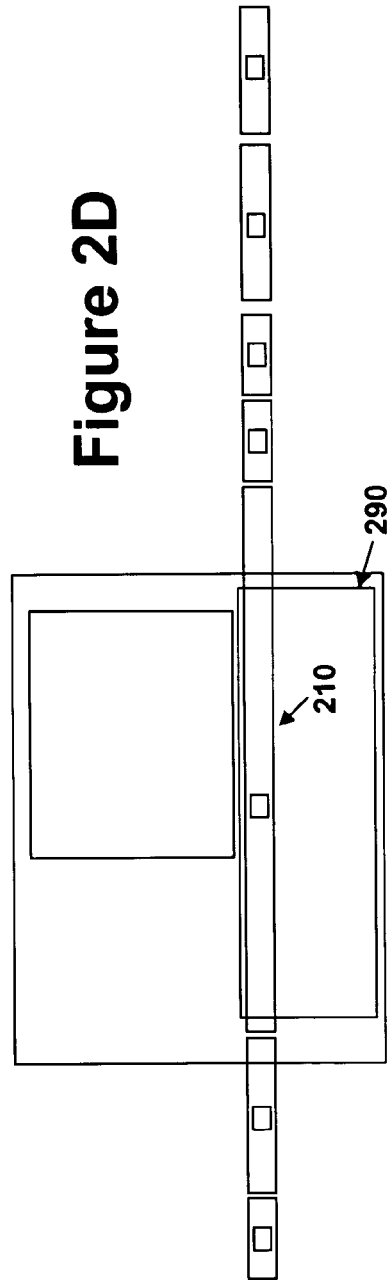

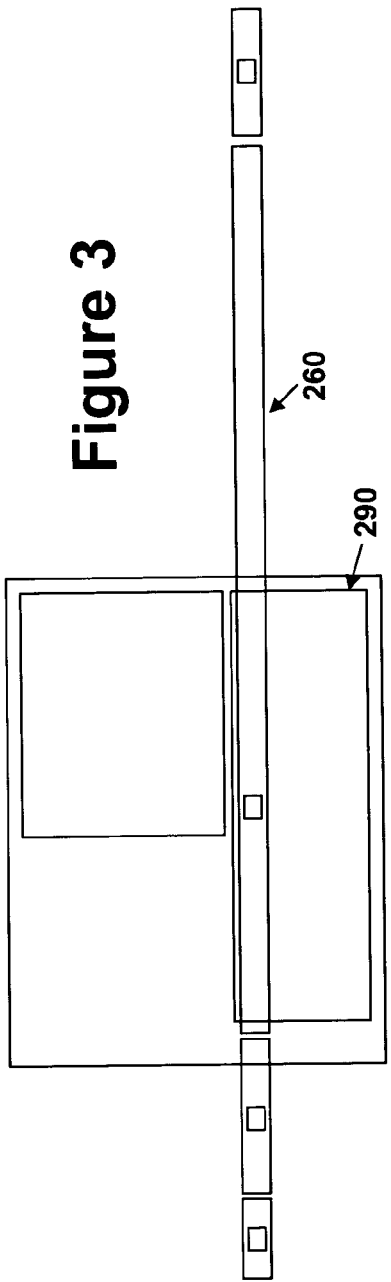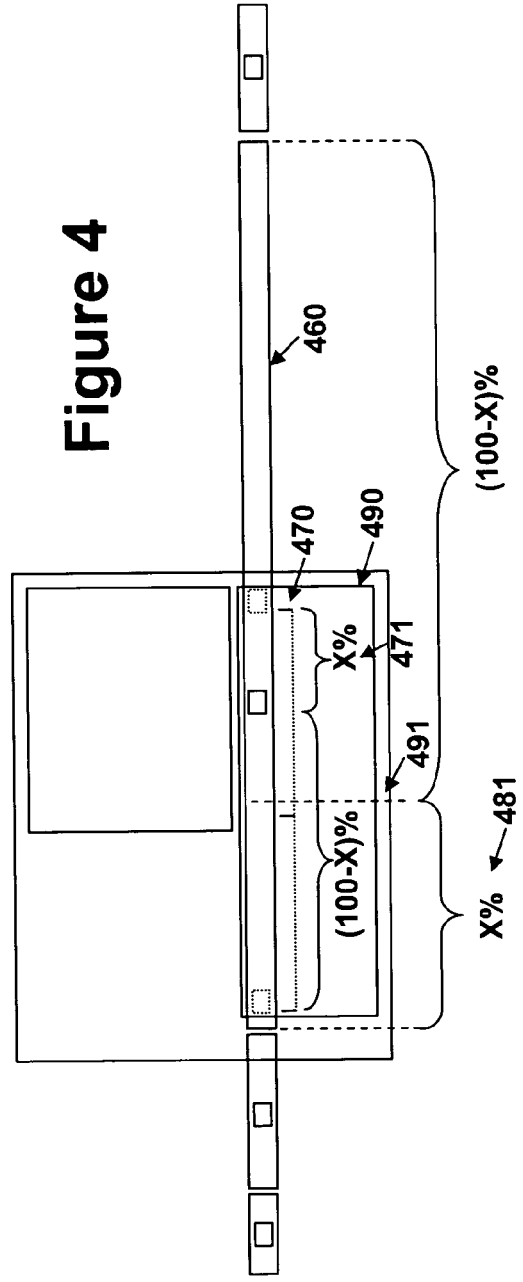

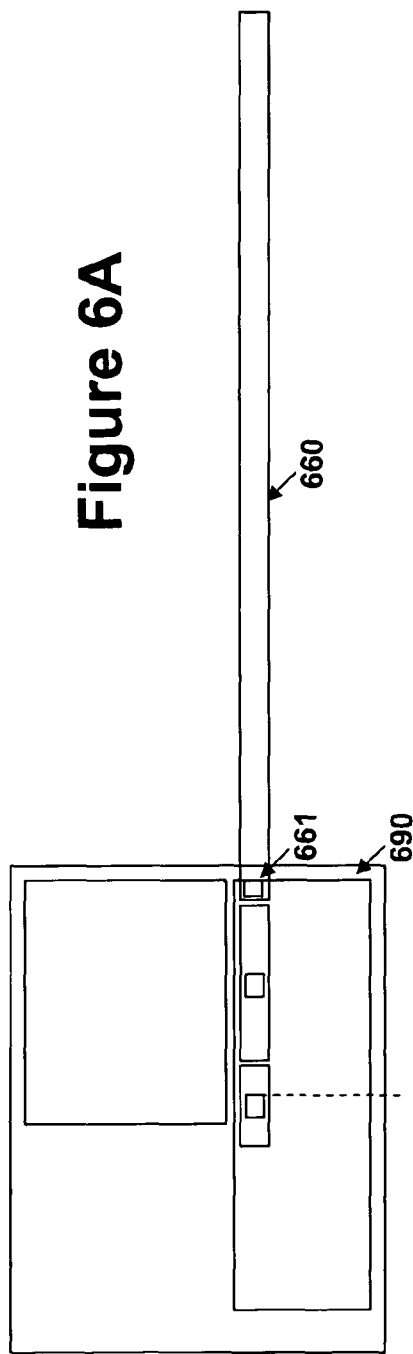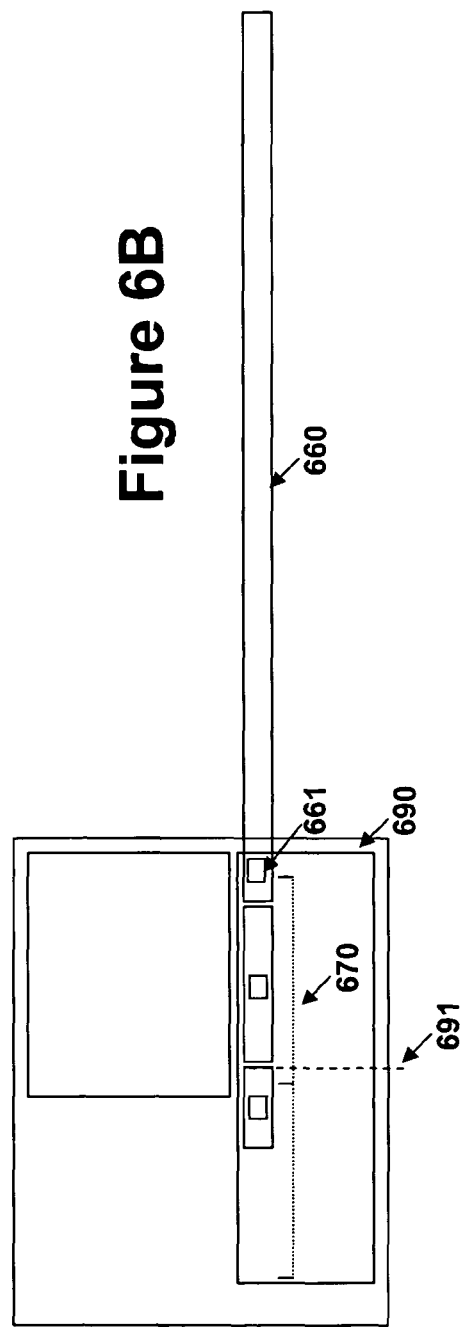

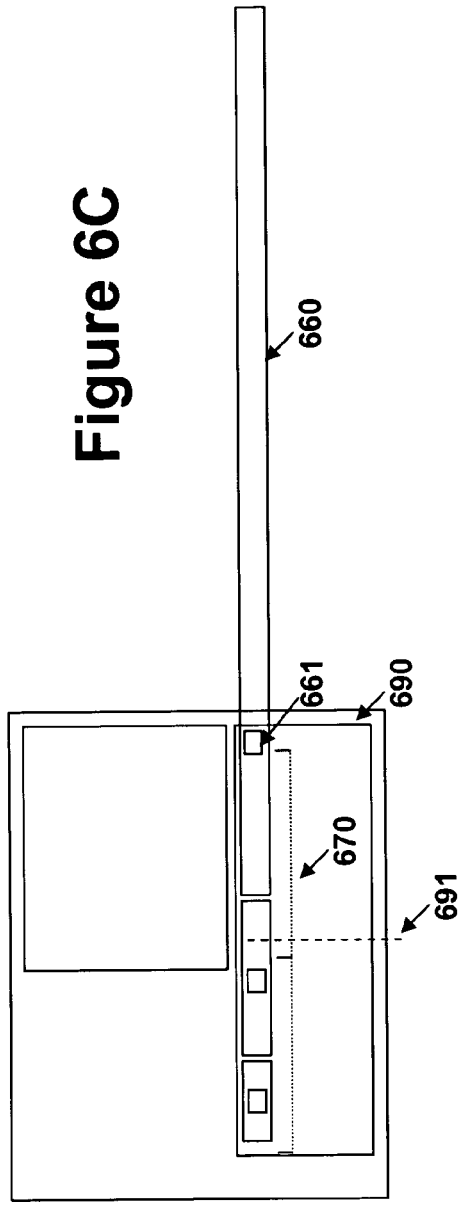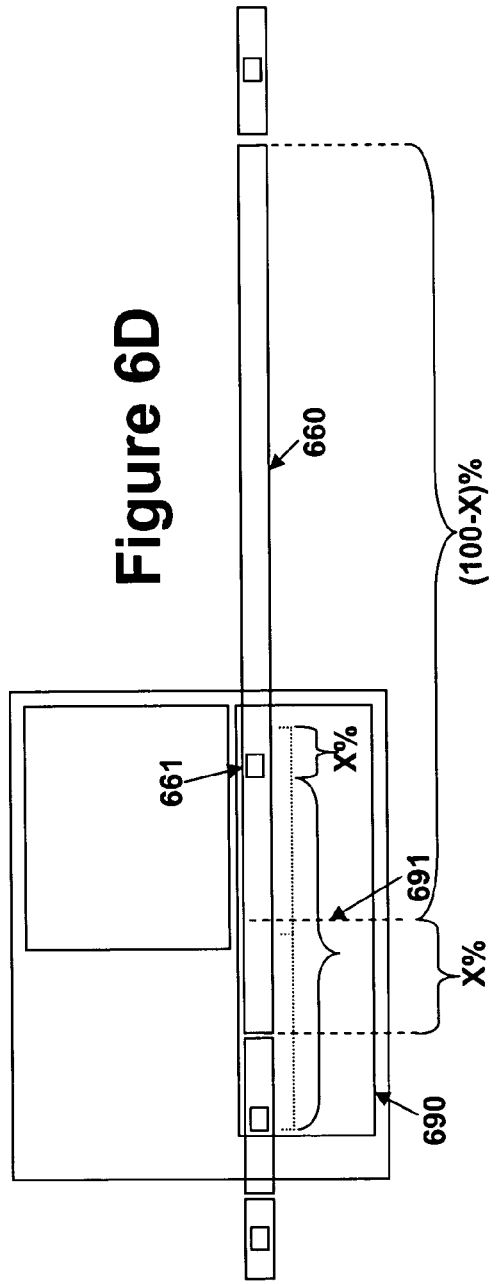

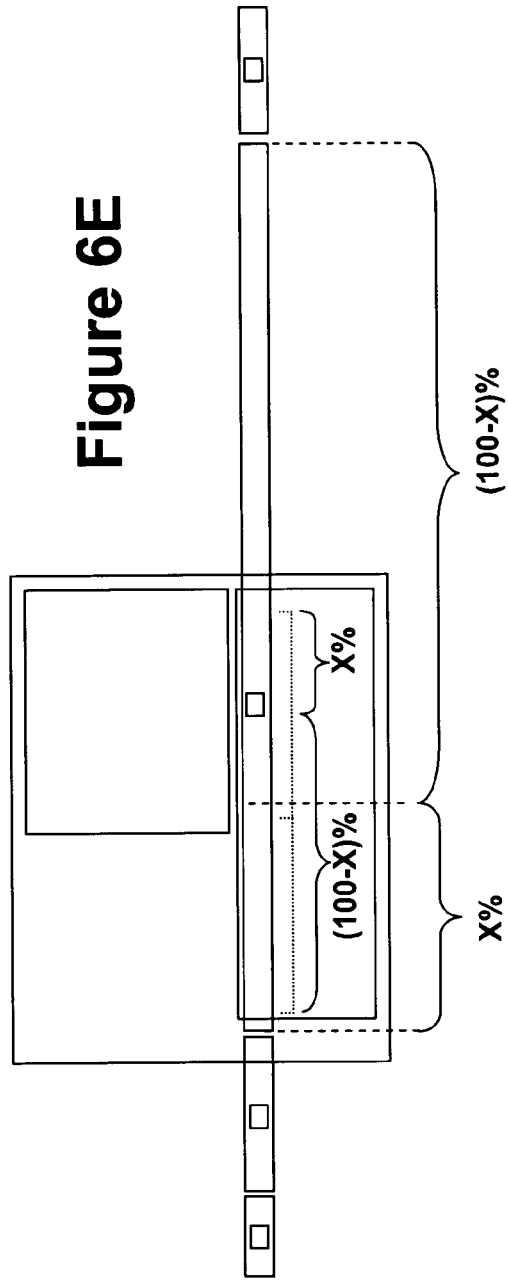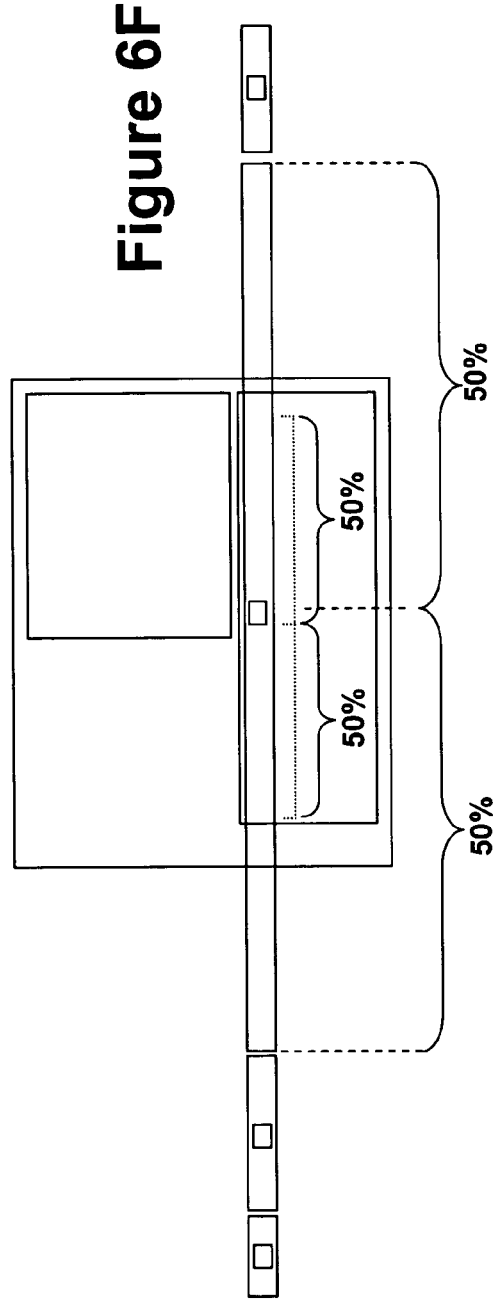

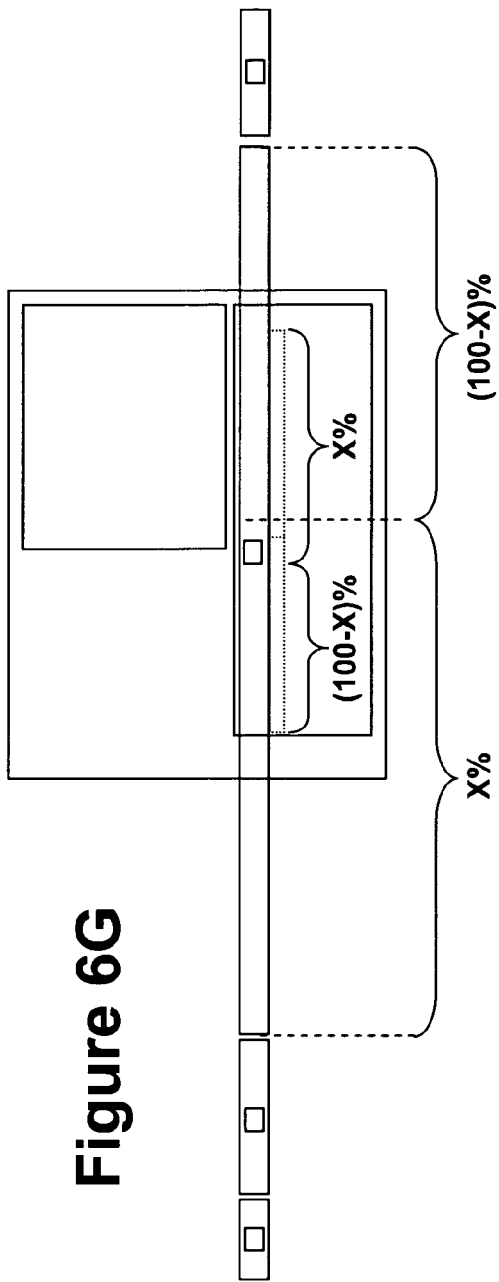

ICON LABEL PLACEMENT IN A GRAPHICAL USER INTERFACE

CLAIM OF BENEFIT TO PRIOR APPLICATIONS

This application is a continuation application of U.S. patent application Ser. No. 12/029,449, filed Feb. 11, 2008 now U.S. Pat. No. 8,015,492, now published as U.S. Publication 2008/0134065. U.S. patent application Ser. No. 12/029,449 is a continuation application of U.S. patent application Ser. No. 10/638,082, filed Aug. 7, 2003, now issued as U.S. Pat. No. 7,437,682. U.S. Publication 2008/0134065 and U.S. Pat. No. 7,437,682 are incorporated herein by reference.

FIELD OF THE INVENTION

The present invention relates to the field of computer graphical user interfaces. In particular, the present invention discloses a graphical user interface system for displaying a relative location in a within a linear resource that extends beyond a border of a window.

BACKGROUND OF THE INVENTION

For many years, computer systems had the reputation of being very difficult to use. Even when the personal computer revolution began in the late 1970's and the early 1980's, personal computers were still the exclusive domain of computer professionals and computer hobbyists.

In 1984, Apple Computer revolutionized the personal computer industry by introducing the first computer system with a Graphical User Interface (GUI) based operating system. Specifically, Apple Computer introduced the Lisa and Macintosh computer systems that used a new operating system now known as the MacOS (Macintosh Operating System).

The MacOS used pull-down menus, windows, and an icon based user interface on a bit-mapped graphical display screen. The user could interact with the MacOS graphical user interface using a cursor control device known as a 'mouse' in order to select pull-down menu items, highlight text, and interact with graphical user interface elements such as scroll bars, slider bars, and radio buttons.

The introduction of a friendly intuitive graphical user interface to the personal computer industry opened the world of computing to everyone. The mouse and window based graphical user interface was soon adopted by every personal computer vendor and operating system software company.

Although the now-familiar mouse and window based graphical user interface was revolutionary, there is always room for improvements. It would therefore be desirable to improve upon the existing graphical user interface art.

SUMMARY OF THE INVENTION

To improve the art of graphical user interfaces, the present invention introduces a system that displays iconic resource representations having a salient dimension in a manner that provides the user with an indication of where the user is within that resource. The system of the present invention achieves this goal with the use of a novel system of icon label placement for that resource icon.

The system of the present invention uses the position of a label on an iconic resource representation that extends beyond at least one edge of a window to convey a proportional position within than iconic resource representation. Thus, a user is given an understanding of the current proportional location within an iconic resource representation from where the graphical interface system renders the label on the iconic resource representation.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which:

FIG. 2A illustrates a conceptual diagram depicting the graphical user interface of FIG. 1 with additional video information that is not displayed on the display screen.

FIG. 2B illustrates the graphical user interface of FIG. 2A after a user has scrolled further along in the time dimension thus moving the video information to the left.

FIG. 2C illustrates the graphical user interface of FIG. 2B wherein labels for the video information icon representations that do not fit on the screen have been moved onto the portion that is on the display screen.

FIG. 2D illustrates the graphical user interface of FIG. 2C wherein the user has scrolled further along in the time dimension thus moving the video information to the left such that only a single large video icon representation is displayed.

FIG. 3 illustrates the graphical user interface of FIG. 1 wherein on a portion of a very long video icon representation is displayed on the screen such that a user has no reference point.

FIG. 4 illustrates the graphical user interface of FIG. 3 wherein a set of measurements are illustrated.

FIGS. 6A to 6G illustrate an example of a label rendered on an iconic resource representation in the mariner taught by the present invention.

DETAILED DESCRIPTION OF THE PREFERRED EMBODIMENT

A method and apparatus for rendering a graphical user interface that indicates relative location in a within a resource that extends beyond the screen limits is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to video editing application program and with resources having a time dimension displayed in a timeline window. However, the techniques of the present invention can easily be applied to other application programs, operating systems, and other types of resources that are displayed with a salient dimension that is represented by the length of an icon representation.

A Video Editing User Interface

Figure 1:
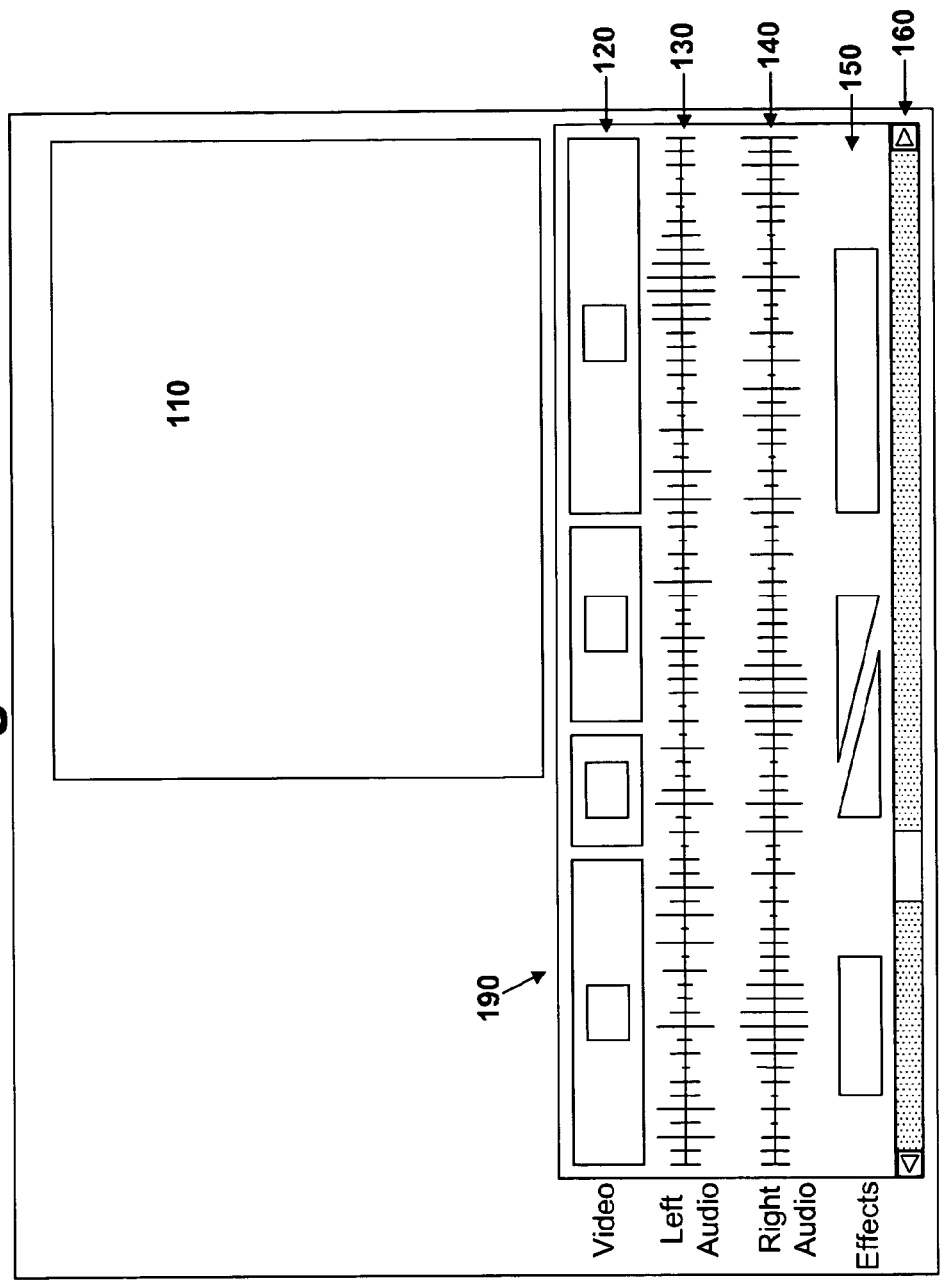
FIG. 1 illustrates a diagram depicting the graphical user interface of an example video editing application program that renders timeline based resources in a timeline window.

FIG. 1 illustrates a diagram depicting the graphical user interface of an example video editing application program. In the example video editing application program of FIG. 1, the graphical user interface includes a video viewing area 110 and a video timeline window 190. The video viewing area 110 allows the user to view the video that is being edited. The video timeline window 190 allows the user to see a visual representation of various video elements. The user may also edit the various video elements displayed in the video timeline window 190.

The example video timeline window 190 of FIG. 1 depicts four different time based resources of a video that is being edited. Specifically, the video timeline window 190 depicts a video resource timeline 120, a left audio timeline 130, a right audio timeline 140, and a special effects (wipes, fades, etc.) timeline 150. The video resource timeline 120 contains a number of video clips wherein each video clip contains series of video frames. The various elements are rendered as icon representations wherein the horizontal dimension of the icon represents a length of time of the resource.

It must be emphasized that video timeline window 190 is merely one simple example of an example video timeline window. Other implementations may contain many more different time based resources. More importantly, it must be emphasized that although the invention is being disclosed with reference to a timeline based application, the teachings of the present invention are applicable to any computer program that displays any type of resource in a linear form that may exceed display limits. For example, other types of linear resources include computer memory allocation, venue seating, etc.

The video timeline window 190 only depicts a small time window into a larger timeline representing the entire video project. For example, FIG. 2A illustrates the graphical user interface of FIG. 1 with additional video resource information that does not fit within the video timeline window 290 on the display screen. Referring back to FIG. 1, a user may scroll around through the entire timeline using scroll bar 160 as is well known in the art. In a preferred embodiment, a user can also change the scale of the video timeline window 290 such that more or less information will be displayed in the video timeline window 290.

Timeline Rendering Issues

FIG. 2A illustrates the graphical user interface of FIG. 1 with additional video information that is not displayed on the display screen. In order to provide a clear representation, other video resource information such as the audio and special effects tracks have been removed. In the graphical user interface of FIG. 2A each video clip has a still frame image from the video clip rendered as a label on the associated video clip representation. For example, video clip 220 has still image label 221 and video clip 210 has still image label 211. In the embodiment of FIG. 2A, the still image labels are always rendered in the center of the associated video clip icon representation.

The graphical user interface implementation displayed in FIG. 2A does not work well when a video clip icon representation does not fit completely on the screen. For example, FIG. 2B illustrates the graphical user interface of FIG. 2A after a user has scrolled further along in the time dimension thus moving the video clip icon representations to the left. As illustrated FIG. 2B, portions of video clips 210 and 220 will be rendered in the video timeline window 290 but the associated centered still images 211 and 221 will not.

One method of remedying this problem is to display the still image associated with a video clip in the center of whatever portion of the video clip representation is displayed in the video timeline window 290. FIG. 2C illustrates such a solution wherein the still images 211 and 221 are rendered in the center of the visible portions of video clips 210 and 220.

The graphical user interface solution of FIG. 2C has its own inadequacies. For example, the video timeline window 290 does not convey much information when an iconic resource representation extends beyond both borders of the video timeline window 290. FIG. 2D illustrates the graphical user interface of FIG. 2C after a user has scrolled further along in the time dimension thus moving the video clip icon representations to the left. As illustrated in FIG. 2D, a portion of video clip representation 210 occupies the entire width of the video timeline window 290. As the user scrolls slightly to the right or left, no feedback will be provided to the user since video clip representation 210 will continue to occupy the entire width of the video timeline window 290.

Larger video clip representations will make the lack of feedback problem even worse. For example, FIG. 3 illustrates a video editing application graphical user interface with a very large video clip representation 260. A user slowly scrolling further along in time (such that the iconic representations move left) in the video timeline window 290 of FIG. 3 will continue to only see video clip representation 260 occupy the entire video timeline window 290.

Icon Label Placement

To improve a graphical user interface that displays iconic resource representations having a salient dimension that may exceed the size of the window, the present invention introduces a novel system of icon label placement. Specifically, the system of the present invention uses the position of a label on an iconic resource representation that extends beyond at least one edge of a window to convey a proportional position within than iconic resource representation. Thus, a user is given an understanding of the current proportional location within an iconic resource representation from where the graphical interface system renders the label on the iconic resource representation.

An Example Implementation

Figure 5:
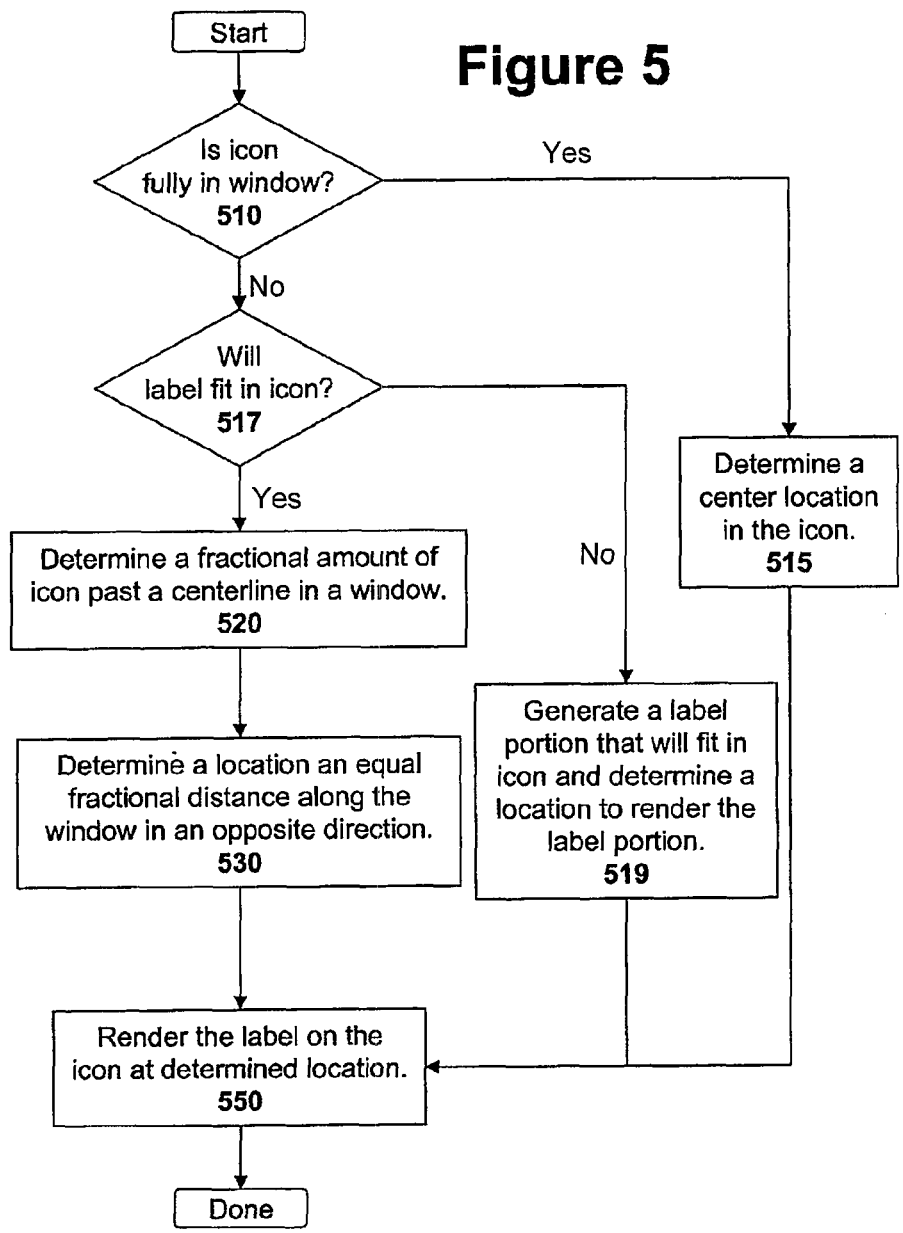
FIG. 5 illustrates a flow diagram that describes how one embodiment of the present invention may render labels on the iconic representations of resources that will be displayed in a window of a graphical user interface.

FIGS. 4 and 5 illustrate how one embodiment of the present invention operates using the example of FIG. 3. FIG. 4 contains a diagram of the example of FIG. 3 with additional dimensions added for explanatory purposes. (These dimensions are not rendered on the action display.) FIG. 5 illustrates a flow diagram that describes how one embodiment of the present invention may render labels on the iconic representations of resources that will be displayed in a window of a graphical user interface. It must be stressed that FIGS. 4 and 5 illustrate only one possible embodiment that uses an icon resource representation's label position to indicate the current location within the icon resource representation.

At step 510 of FIG. 5, the system first determines if the iconic representation of a resource is fully within the window. If the iconic representation of the resource fits fully within the window then the system will proceed to step 515 to determine a center location of the iconic representation of the resource that will be used to render the label. If all the iconic resource representations to be displayed fit fully within the window, then all the labels will be rendered in the center of the iconic resource representations. An example of that particular case is illustrated in FIG. 2A.

Next, in step 517 of FIG. 5, the system determines if the label will fully fit within the portion of the iconic representation that will be rendered in the window. If the label will not fully fit within the displayed portion of the iconic resource representation then the system will proceed to step 519 to determine a clipped portion of the label that will fit within the displayed portion of the iconic resource representation and a location for that clipped label. Thus, step 519 handles the case wherein a very small portion of an iconic resource representation is drawn at one of the edges of the window.

If an iconic representation of a resource will not fully fit within the window but the label will fully fit in the iconic resource representation then the system will proceed to step 520. At step 520, the system determines a fraction amount of iconic resource representations that extends past a center of the window. Thus, referring to the example of FIG. 4, the system determines a fraction amount 481 of the entire length iconic resource representation 460 that extends beyond the centerline 491 of window 490. This is simply the length of the iconic resource representation past the centerline 491 divided by the overall length of the iconic resource representation 460.

Next, at step 530, the system uses the fraction determined in step 520 determines a location approximately equal to fraction distance along the window in an opposite direction. Specifically, referring again to the example of FIG. 4, the system determines a fractional amount 471 of the window width along the window 490 in an opposite direction. Not that in order to fit the label on the screen, the location should be selected from a limited set of locations along label location set 470 that will ensure that the label will fully fit within the window.

Finally at step 550, the system renders the label (or clipped portion of the label) at the determined location. The steps of FIG. 5 are repeated for each iconic resource representation that will be displayed in the window.

The method of FIG. 5 can be implemented in computer instructions for any computer system having a graphical display. The computer instructions may be placed onto a computer-readable media and distributed. The computer instructions may also be transmitted across a communication channel to receiving system. For example, a computer program implementing the method of FIG. 5 may be transmitted from a server computer to a client computer system and executed on that client computer system.

An Example of Operation

An example of how the label will be rendered on an iconic resource representation that is scrolled across the window will be provided with reference to FIGS. 6A to 6K. FIG. 6A illustrates a large iconic resource representation 660 that has just begun to enter a video timeline window 690. Thus, only a very small slice of iconic resource representation 660 displayed window. In such a situation, the system of the present invention would proceed to step 519 of FIG. 5 to generate a label portion that will fit in the slice of the iconic resource representation 660 and determine a location to render the label portion. The system then displays the label slice 661 in the small displayed portion of iconic resource representation 660.

FIG. 6B illustrates the large iconic resource representation 660 of FIG. 6A displayed in graphical user interface window 690 after the user has scrolled to the right thus displaying more of large iconic resource representation 660. Since no part of iconic resource representation 660 has past the center of video timeline window 690, the label 661 is rendered at the right end of scale 670.

FIG. 6C illustrates the graphical user interface of FIG. 6A after the user has scrolled further to the right thus displaying more of large iconic resource representation 660. Again, since no part of iconic resource representation 660 has past the center 691 of video timeline window 690, the label 661 is rendered at the right end of scale 670.

FIG. 6D illustrates the graphical user interface of FIG. 6C after the user has scrolled even further to the right thus displaying more of large iconic resource representation 660. In FIG. 6D, iconic resource representation 660 extends past the center 691 of video timeline window 690. Specifically, X % of the total length of iconic resource representation 660 is located on the other side of the center 691 of video timeline window 690. Thus, the system of the present invention renders the label 661 approximately X % from the right side of scale 670.

FIG. 6E illustrates the graphical user interface of FIG. 6D after the user has scrolled yet even further to the right such that resource representation 660 fills the entire video timeline window 690. As illustrated in FIG. 6D, X % of the total length of iconic resource representation 660 is located on the left side of the center 691 of video timeline window 690. Thus, the system of the present invention renders the label 661 approximately X % from the right side of scale 670.

FIG. 6F illustrates the graphical user interface of FIG. 6E after the user has scrolled yet even further to the right such that iconic resource representation 660 is completely centered upon the center 691 of video timeline window 690. Specifically, 50% of iconic resource representation 660 is on the left of center line 691 and 50% of iconic resource representation 660 is on the right of center line 691 Thus, the system of the present invention renders the label 661 50% from the right side of scale 670 such that label 661 is centered in window 690.

As the user continues to scroll further to the right, the system of the present invention will continue to move label 661 to the right in the same manner as set forth in FIGS. 6A to 6F. For example, FIG. 6G illustrates the graphical user interface of FIG. 6F after the user has scrolled yet even further to the right such that more of resource representation 660 falls to the left of the center 691 of video timeline window 690. Specifically, X % of the total length of iconic resource representation 660 is located on the left side of the center 691 of video timeline window 690. Thus, the system of the present invention renders the label 661 at a location approximately X % from the right side of scale 670.

The foregoing has described a method for rendering a graphical user interface that indicates relative location in a within a resource that extends beyond the screen limits. It is contemplated that changes and modifications may be made by one of ordinary skill in the art, to the materials and arrangements of elements of the present invention without departing from the scope of the invention.

I claim:

1. A non-transitory computer readable medium storing a computer program for providing a graphical user interface (GUI), the GUI comprising:
   a resource icon that extends beyond at least one border of a display area such that only a portion of the resource icon is displayed in the display area, wherein a length of the resource icon represents a salient dimension of a resource; and
   a label automatically rendered at a position in the display area, wherein the label is rendered adjacent to a border of the display area when the resource icon fails to overlap a centerline of the display area, and wherein the label is rendered with distances from the label to two ends of the display area have a same proportion as distances from a center of the display area to two ends of the entire resource icon when the resource icon crosses the centerline of the display area.

2. The non-transitory computer readable medium of claim 1, wherein the label is rendered in a first size when the displayed portion of the resource icon is larger than or equal to the first size, wherein the label is rendered in a smaller second size when the displayed portion of the resource icon is smaller than the first size.

3. The non-transitory computer readable medium of claim 1, wherein the position of the label is at a percentage of a length of the displayed portion of the resource icon, the percentage indicating a percentage of the length of the entire resource icon that passes a center of the display area in the first direction.

4. A non-transitory computer readable medium storing a computer program executable on one or more processors, the computer program comprising sets of instructions for:
- displaying a portion of an icon in a display area, the icon extending beyond at least one border of the display area such that only a portion of the icon is displayed in the display area, wherein a length of the icon represents a salient dimension of a resource;
- tracking at least one end of the icon in reference to a centerline of the display; and
- automatically placing a label at a position within the icon in the display area based on a fraction of the length of the icon that extends beyond the centerline of the display area in a particular direction.

5. The non-transitory computer readable medium of claim 4, wherein the computer program further comprises a set of instructions for receiving a user instruction to move the icon.

6. The non-transitory computer readable medium of claim 5, wherein the computer program further comprises a set of instructions for moving the label relative to the displayed portion of the icon in response to a movement of the icon.

7. The non-transitory computer readable medium of claim 4, wherein the computer program comprises a video editing application.

8. The non-transitory computer readable medium of claim 4, wherein the label is in a first size when the displayed portion of the icon is larger or equal to the first size, wherein the label is in a smaller second size when the displayed portion of the icon is smaller than the first size.

9. The non-transitory computer readable medium of claim 4, wherein the label is close to the border of the display area when the icon extends beyond the border of the display area but does not cross a center of the display area.

10. The non-transitory computer readable medium of claim 4, wherein the position of the label is at a percentage of a length of the displayed portion of the resource icon from a first end of a scale representing a portion of the display area, the percentage indicating a percentage of the length of the entire resource icon that crosses a center of the display area.

11. The non-transitory computer readable medium of claim 4, wherein the resource comprises a video clip, wherein the label comprises an image from the video clip.

12. The non-transitory computer readable medium of claim 4, wherein the salient dimension of the resource comprises a time length.

13. A method of rendering a graphical user interface for a computer program, the method comprising:
- rendering a representation of a resource icon that extends beyond at least one border of a display area such that only a portion of the resource icon is displayed in the display area, a length of the resource icon representing a salient dimension of a resource; and
- by a computing device, automatically rendering a label at a particular location on the portion of the resource icon displayed in the display area based on,
  - a fraction of the resource icon that overlaps a centerline of the display area in a first direction, and
  - which side of the center of the display area the icon is visible on if the icon does not pass the center of the display area.

14. The method of claim 13, wherein the particular location of the label is at a percentage of a length of the displayed portion of the resource icon, the percentage indicating a percentage of the length of the entire resource icon that passes the center of the display area in the first direction.

15. The method of claim 13, wherein the label is rendered in a first size when the displayed portion of the resource icon is larger than or equal to the first size, wherein the label is rendered in a smaller second size when the displayed portion of the resource icon is smaller than the first size.

16. The method of claim 13, wherein the label is rendered on the displayed portion of the resource icon.

17. A non-transitory computer readable medium storing a computer program for generating a graphical user interface (GUI), the GUI comprising:
- a user interface tool for selecting a video clip for display; and
- a display area for:
  - displaying a portion of a representation of a selected video clip, the representation having a size that corresponds to a duration of the video clip and that extends past at least one edge of the display area, and
  - displaying a label at a particular location on the portion of the representation of the selected video clip in the display area based on,
    - a fraction of the representation that overlaps a centerline of the display area in a first direction, and
    - which side of the center of the display area the icon is visible on if the icon does not pass the center of the display area.

18. The non-transitory computer readable medium of claim 17, wherein the display area is further for displaying a timeline, wherein the representation of the video clip is displayed on the timeline in the display area.

19. The non-transitory computer readable medium of claim 17, wherein distances from the label to two ends of the display area have a same proportion as distances from a center of the display area to two ends of the entire representation.

20. The non-transitory computer readable medium of claim 17, wherein the label comprises an image from the video clip.

* * * * *